United States Patent [19]

Holmes et al.

[11] 4,235,952
[45] Nov. 25, 1980

[54] BOND SEAM COATING OF FRP MOLDINGS

[75] Inventors: Richard G. Holmes, Wadsworth; David R. Sponseller, Akron, both of Ohio

[73] Assignee: The General Tire & Rubber Company, Akron, Ohio

[21] Appl. No.: 22,394

[22] Filed: Mar. 21, 1979

[51] Int. Cl.² .................. B32B 3/00; B05D 5/00; B32B 3/08
[52] U.S. Cl. .................................. 428/60; 156/159; 427/140; 427/264; 427/265; 428/61; 156/304.3; 156/304.5; 264/36; 264/152; 264/162
[58] Field of Search .............. 156/159, 304; 427/140, 427/265, 407 C, 407 G, 264; 428/60, 61; 264/162

[56] References Cited

U.S. PATENT DOCUMENTS

| 4,076,780 | 2/1978 | Ditto | 264/325 X |
| 4,076,788 | 2/1978 | Ditto | 264/265 X |
| 4,081,578 | 3/1978 | Essen et al. | 264/247 X |
| 4,082,486 | 4/1978 | Cerano et al. | 425/200 X |

Primary Examiner—Evan K. Lawrence

[57] ABSTRACT

The cured polyester or polyurethane adhesive bond seam joining two FRP (fiberglass reinforced plastic) parts, particularly in-mold coated FRP parts, is coated with a reactive polyepoxide resin-polyamide resinamine coating. After curing, sanding, sealing and painting, the seam area joining the parts did not exhibit any paint pops or sinks and the seam itself was invisible or nearly invisible.

6 Claims, 5 Drawing Figures

BOND SEAM COATING OF FRP MOLDINGS

BACKGROUND OF THE INVENTION

This invention relates to a bond seam coating composition of a polyamide resin, epoxide resin and an amine useful in coating the bond seam between bonded FRP (fiberglass reinforced plastic) moldings, particularly in-mold coated FRP moldings or parts.

FRP (fiberglass reinforced plastics, for example, fiberglass reinforced polyesters) for automobiles and other vehicles in many cases are made in sections and bonded together by means of adhesives. This is because some of the moldings are too large to be made in one part or may be too complicated to be made in one mold. For example, the fender of one automobile is made of at least two parts. After molding, the edges to be joined are beveled to form a V-like trough or seam when brought together, a back-up FRP strip is assembled with the parts, a polyurethane or polyester adhesive is applied to the seam, and the adhesive is cured to form a bonded composite or integral article, molding, fender and so forth. The seam area is then sanded, primed, sealed and painted. Even after such treatment, it is many times possible to see the seam line. These parts also, may show paint pops, sinks and so forth. Sanding and repainting or finishing are required to obtain the proper Class "A" surface. While many of these problems have been overcome by use of the in-mold coating process, it has been found that the adhesives used to bond the parts together still give bonded parts which exhibit a seam on examination at an angle in ordinary light and paint pops, sinks and so forth in the seam area. The seam is particularly noticeable since the in-mold coating process gives FRP parts which after priming, sealing and painting exhibit a high gloss.

Accordingly, it is an object of the present invention to overcome the difficulties alluded to hereinabove and to provide bonded FRP parts which after finishing do not show paint pops, sinks and so forth and wherein the seam line is not visible or just barely visible and a process for making the same.

These and other objects and advantages of the present invention will become more apparent to those skilled in the art from the following detailed description, working example and drawing.

SUMMARY OF THE INVENTION

According to the present invention it has been discovered that the use of a coating of a cured epoxy resin-polyamide resin-amine composition over the polyester or polyurethane seam joining two FRP moldings together followed by sealing and painting will provide an integral part which does not exhibit paint pops, sinks and so forth and wherein the seam joining the parts is invisible or nearly invisible.

DISCUSSION OF DETAILS AND PREFERRED EMBODIMENTS

Figure 1:
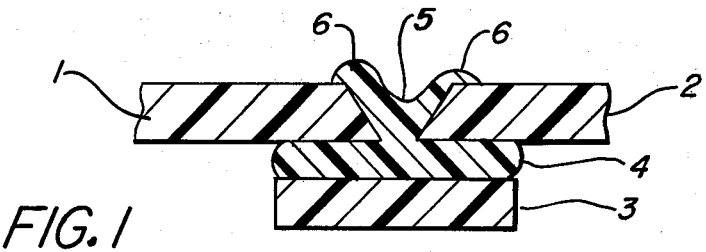
FIG. 1 is a cross section of FRP moldings joined by an adhesive seam.

FRP (fiberglass reinforced plastic, such as polyester) thermoset moldings are well known. They may be produced from compositions of fiberglass containing an unsaturated polyester, unsaturated monomer for crosslinking like styrene, catalyst and other well known compounding ingredients sometimes called SMC (sheet molding compound) and cured in a mold under heat and pressure to form a thermoset article. An example of a composition for making an FRP part is shown as follows:

| Ingredient | Parts by Weight |
| --- | --- |
| "Paraplex" P340 | 4,000 |
| "Paraplex" P681 | 2,240 |
| "Paraplex" P543 | 772 |
| "Camel-Wite" | 10,520 |
| TBP | 70 |
| Zinc stearate | 350 |
| Mg(OH)$_2$ | 316 |
| Glass fibers | 7,830 |

Notes:
"Paraplex" P 340 - A 65% by weight solution of polyester in styrene, the polyester being essentially a polypropylene fumarate, OH No. of 35, COOH No. of 35, average molecular weight of about 1,600. Rohm & Hass Company.
"Paraplex" P 681 - 35% by weight solution of polymethylmethacrylate containing some carboxyl groups in styrene. Rohm & Haas Company.
"Paraplex" P 543 - 35% by weight solution of polymethylmethacrylate in styrene. Rohm & Haas Company.
"Camel-Wite" - Calcium carbonate (limestone), average particle size of 3.3 microns, Campbell Grove Division of H. M. Royal.
TBP - Tertiary butyl perbenzoate.

After formation of the cured thermoset FRP moldings, an in-mold coating composition is prepared by mixing together two reactive components forming the in-mold coating composition and compression or injection molding the composition on the surface of the molded FRP part under heat and pressure usually without taking the FRP part from its mold. An example of an in-mold coating composition is shown below:

| PART ONE | |
| --- | --- |
| COMPONENT | PARTS BY WEIGHT |
| "Isonate" 143L (liquid, essentially diphenylmethane-4,4'-diisocyanate, functionality of about 2.2, equiv. wt. of 143) Upjohn Co. | 7.25 |
| Polyethylene butylene adipate (OH terminated, saturated, MW 2500), flexibilizer | 3.0 |
| Talc | 4.0 |
| TBP (t-butyl perbenzoate) | .25 |
| PDO (t-butyl peroctoate, 50% in diallyl phthalate) | .05 |

| PART TWO | |
| --- | --- |
| COMPONENT | PARTS BY WEIGHT |
| Polypropylene fumarate (MW 2500), OH functionality of 2, 70% solution in styrene monomer | 15.0 |
| "Pluracol" PEP 450, Wyandotte, OH functionality of 4, PO adduct of pentaerythritol | 4.24 |
| Talc | 3.85 |
| "Zelec" UN-release agent, du Pont | 0.025 |

-continued

PART TWO

| COMPONENT | PARTS BY WEIGHT |
| --- | --- |
| 2% benzoquinone in styrene | 0.3 |
| Polyethylenbutylene adipate (MW 2500, saturated, OH terminated) | 1.35 |

Parts One and Two are stirred separately. Then Part One is added to Part Two and both are stirred and the resulting mixture is poured on the molded part and molded and cured to provide a thermoset in-mold coating on the FRP part. Additionally, the in-mold coating composition can contain in Part One and/or Part Two various other fillers, low shrink additives like polyvinylacetate and so forth.

Processes and apparatuses for molding FRP parts and for in-mold coating FRP parts are shown by U.S. Pat. Nos. 4,081,578; 4,076,780; 4,076,788, and 4,082,486. Please see also, "Proceedings of the Thirty-Second Annual Conference Reinforced Plastics/Composites Institute," SPI, Washington, February, 1977, Griffith et al, Section 2-C, pages 1-3 and "33rd Annual Technical Conference, 1978 Reinforced Plastics/Composites Institute The Society of the Plastics Industry, Inc.", SPI, Ongena, Section 14-B, pages 1-7.

Epoxy resins are well known. They are generally made by reacting epichlorohydrin with a polyol like bisphenol A or 1,4-butanediol. They may have an average molecular weight of from about 200 to 3800 and an epoxide equivalent of from about 100 to 4000. Preferably, the epoxide resins have an average molecular weight of from about 200 to 450 and an epoxide equivalent of from about 100 to 290. The liquid epoxy resins are preferred. Mixtures of epoxy resins may be used. For more information on epoxy resins see "Epoxy Resins," Advances in Chemistry Series 92, American Chemical Society, Washington, 1970; "Epoxy Resins," Lee and Neville, McGraw-Hill Book Company, Inc., New York, 1957; "Epoxy Resins," Skeist and Somerville, Reinhold Publishing Corp., 1958; and "Epoxy Resin Technology," Bruins, Interscience Publishers, a Division of John Wiley & Sons, New York, 1968.

The epoxide resins are cured by means of reactive polyamide resins (having reactive amino groups) in an amount at least sufficient to react with substantially all of the epoxide groups of the epoxide resins. The polyamide resins are preferably the condensation products of polyamines and dibasic acids obtained when certain unsaturated fatty acids are polymerized (polymerized vegetable oil acids). However, many other types of polyamide resins can be obtained by the use of various dibasic acids and diamines. The polyamide resins have amine values (milligrams of KOH equivalent to base content of one gram of polyamide as determined by HCl titration) of from about 83 to 400, preferably about 290-320. These polyamides preferably should be liquid. Mixtures of polyamides can be used. They have the general formula: HO+OC—R—CONHR$^1$—NH+$_n$H where R, R$^1$ and n will vary in the different grades of polyamide resins. For more information on such polyamide resins please see "Polyamide Resins," Floyd, Reinhold Publishing Corp., New York, 1958 and Second Edition, 1966.

The reaction between the epoxy resin and the polyamide resin is accelerated by primary diamines which, also, furnish the remainder of the amino groups for reaction with the epoxy groups of the epoxide resins so that stoichiometry is obtained between the amino groups and the epoxide groups to complete the cure. Examples of such amines are ethylene diamine, diethylenetriamine, triethylenetetramine, tetraethylpentamine, metaphenylenediamine, menthanediamine and so forth and mixtures thereof. The preferred diamine to use is ethylene diamine.

Minor amounts by weight of thixotropic agents may be added to the bond seam coating composition like silia such as colloidal silica and so forth to control the flow of the bond seam coating composition during and after application.

The coating of the composition of the epoxy resin, polyamide resin and diamine is then heated for a period of time and at a temperature sufficient to cure the composition. Excess heat and time should be avoided to prevent damage to the adhesive of the bond seam or to the FRP parts.

While this invention has been described with particular references to in-mold coated FRP moldings, it will be appreciated that it can be used with other FRP moldings which have not been in-mold coated. Moreover, moldings made of more than two FRP parts can be treated by the process of the present invention. Also, while this invention has special utility with respect to automobile parts like fenders, door panels, roofs, deck hoods, grills and headlamp assemblies and so forth, it can be used for making other automobile parts, truck parts, snowmobile parts, appliances and electrical components, furniture, machine covers and guards, bathroom components, outboard motor parts and so forth.

The following example will serve to illustrate the present invention with more particularity to those skilled in the art.

EXAMPLE

Two thermoset polyesterurethane in-mold coated thermoset glass fiber polyester moldings (molded from standard density SMC-sheet molding compound) having adjacent edges beveled to form together a V-groove or seam when assembled were supported on the underside of the V-groove and adjacent the seam formed by the moldings with an FRP strip bridging the two parts for the length of the V-groove. The molding and strips were treated with a wash primer (Goodyear 6209), dried and then with a polyurethane adhesive made from a polyisocyanate and a polyol (2 component; Goodyear 6200 and 6204). However, instead of the polyurethane adhesive, a polyester adhesive may be used. Sufficient adhesive was used to coat the strip and to fill the V-groove and to form a rounded hill-like mass thereover for the length of the V-groove on the surface of the adjacent flush moldings. The moldings and strip were clamped in a fixture or jig to hold them, and the adhesive was allowed to cure at ambient temperature, then heated to shrink the adhesive. After cure the resulting bonded part was then removed from the jig. On cooling a valley or depression occured where the V-groove was located. Another bonded part was made the same way. Each bonded part was sanded to remove the remaining hill or rounded bond portion at the seam to obtain the best finish so as to retain the originally desired contour and surface finish. Each bonded part was then treated in the bond or seam area as follows:

I. One bonded part was primed over the entire outer surface with a two-component polyurethane primer in solvent (Sherwin-Williams "Polane" E67BB7 and V66V27) along the seam and baked for 30' at 180° F. (82.2° C.). A sealer coat of acrylic-epoxy lacquer (PPG Industries, Inc. 871-571) was applied and flashed for 2 minutes. Then a white acrylic lacquer (duPont 926) was applied and flash dried for 10 minutes and baked for 10' at 180° F. (82.2° C.). The painted bonded part was then reflow baked for 30' at 300° F. (148.9° C.). The seam area appeared raised during heating. After cooling, the treated bonded part exhibited evidence of a seam when viewed in ordinary light at an angle, some sinks and paint pops.

II. The other bonded part was coated in the seam area with a polyepoxy resin-polyamide resin-amine composition as described below. The coating was applied in a built-up fashion and allowed to sit overnight, although allowing the coating to sit overnight is not required, and then baked for 5–15' at 300° F. (148.9° C.). The coated part was then cooled and sanded to restore the original contour. A sealer coat of acrylic-epoxy lacquer (PPG Industries, Inc. 871-571) was then applied and flash dried. Next a white acrylic lacquer (duPont 926) top finish paint was applied, flash dried for 10 minutes, and baked for 10' at 180° F. (82.2° C.). The painted bonded part was then reflow baked for 30' at 300° F. (148.9° C.). The seam had a raised appearance during heating but became nearly invisible after cooling when viewed in ordinary light at an angle. The seam did not exhibit any evidence of sink marks or paint pops. The gloss of the entire outer surface of the bonded part was essentially the same. Moreover, the above cured polyepoxy resin-polyamide resin-amine coating composition is easier to sand than a cured straight epoxy resin coating.

Figure 2:
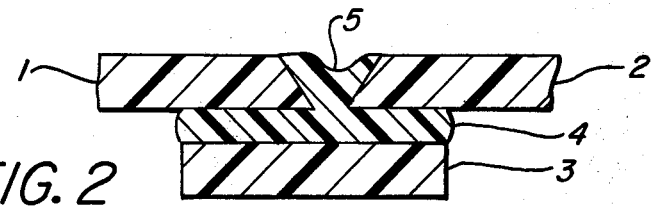
FIG. 2 is a cross section of the FRP moldings after sanding.
Figure 3:
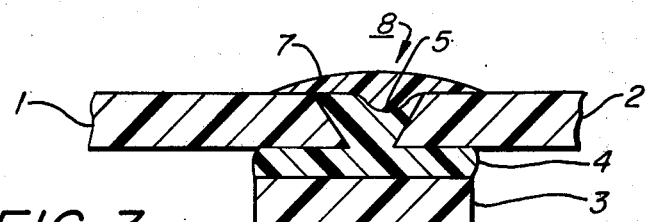
FIG. 3 is a cross section of the FRP moldings after coating.
Figure 4:
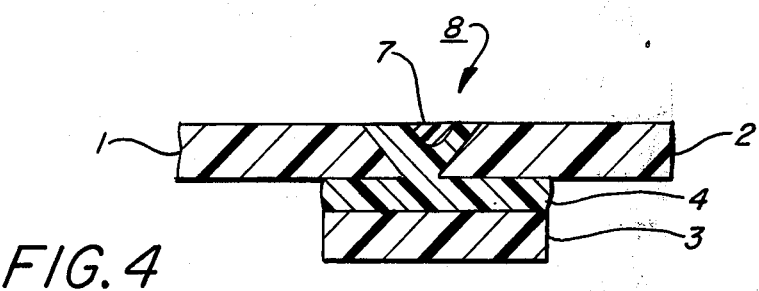
FIG. 4 shows the assembly of FIG. 3 after cooling and sanding.
Figure 5:
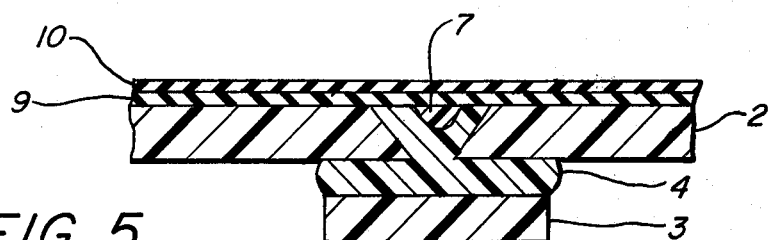
FIG. 5 shows the assembly of FIG. 4 covered with two coats according to the present invention.

With reference to the drawing FIG. 1 shows beveled FRP moldings 1 and 2 joined to FRP bridging strip 3 by means of adhesive 4 after curing, heating and cooling and also showing valley or depression 5 and hills 6—6 formed in the area where the V-groove occurred as defined by the beveled ends of FRP moldings 1 and 2. FIG. 2 shows the assembly of FIG. 1 after it has been sanded to remove hills 6—6. Following FIG. 2, FIG. 3 shows the subsequent application of epoxy-amide-amine composition 7 to cover valley 5 in seam area 8. FIG. 4 shows the assembly of FIG. 3 after cooling and sanding. FIG. 5 shows the assembly of FIG. 4 now containing acrylic-epoxy lacquer sealer coat 9 and white acrylic lacquer top finish paint 10 after drying and baking.

POLYEPOXY RESIN-POLYAMIDE RESIN-AMINE COMPOSITION

PART A

| Ingredient | Parts By Weight |
|---|---|
| Epoxide ("Araldite" RD-2, Ciba-Gigy, 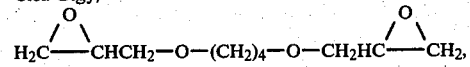 1,4-butanediol diglycidyl ether, epoxide equivalent of 101) | 15 |
| Epoxiode ("Epon" Resin 828, liquid epichlorohydrin bisphenol-A type epoxy resin having an epoxide equivalent of 175–210 or 185–192 (grams of resin containing one gram-equivalent of epoxide), approx. avg. molecular weight of 380, idealized chemical structure: 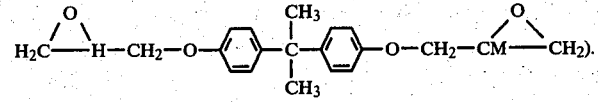 | 5 |
| Silia ("Cab-O-Sil" M-5, fumed silia, surface area (BET)200±25M²/g, particle size 0.012 micron, Cabot Corp. Thixotropic agent.) | 1 |

PART B

| Ingredient | Parts By Weight |
|---|---|
| Polyamide resin ("Versamid" 125, fluid, General Mills, condensation product of polyamines and dibasic acids of polymerized unsaturated fatty acids, amine value of 290–320, Brookfield viscosity of 7–9 poises at 75° C., and Gardner Color of 12 maximum). | 7.5 |
| Ethylene diamine | 1.5 |

To prepare Part A the epoxides were added to a resin kettle and continuously mixed together while elevating the temperature to 47° C. Then the silica was added to the epoxide mixture while agitating. As soon as the silica appeared to be wetted, a vacuum was applied until the mixture was deairated (1 hour @ 27 inches vacuum at 50° C.).

To prepare Part B the polyamide and the amine were mixed together and allowed to deairate at room temperature and pressure. Since ethylenediamine is caustic and fumes very easily, proper care and ventilation are required when using it.

To make the polyepoxy resin-polyamide resin composition Part A was mixed with Part B in a parts by weight ratio of 2 to 1. After thorough mixing of Parts A and B, the resulting composition was applied to the sanded seam area as described above.

Instead of sanding the parts as described above, grinders, cutters and other devices may be used to remove extraneous material and obtain the desired contour, care being observed not to harm the surface of the FRP part.

When the polyepoxy resin-polyamide resin-amine composition was replaced with a polyesterurethane composition or a styrene-unsaturated polyester-peroxide composition in the above process, unsatisfactory results were obtained in that gassing was observed and poor texture was obtained.

We claim:

1. A method for finishing the cured bond seam of an adhesive selected from the group consisting of polyurethanes and polyesters and joining two thermoset fiberglass reinforced plastic moldings together forming a composite article, said seam exhibiting a valley or depression, which comprises
   (a) depositing on and along said seam a built-up layer of a coating composition of an epoxy resin having an epoxide equivalent of from about 100 to 4000 and an average molecular weight of from about 200 to 3800, a polyamide resin having active amino groups and an amine value of from about 83 to 400 and a primary diamine, the amount of said polyamide resin and said diamine being sufficient to react with all of the epoxide groups of said epoxy resin,
   (b) heating said seam coating composition for a period of time sufficient to cure the same,
   (c) sanding said cured seam coating composition along the bond seam area to restore the original contour of the composite article,
   (d) applying a coating of a sealing composition to the surface of said composite article and flash drying the coating and
   (e) applying a coating of a top finish paint to the seal coating on the surface of said composite article, flash drying the coating, baking and reflow baking to obtain a finished composite article essentially free of sinks and paint pops and wherein the seam is invisible or nearly invisible.

2. A method according to claim 1 in which in said coating composition:
   said epoxy resin is a liquid having an epoxide equivalent of from about 100 to 290 and an average molecular weight of from about 200 to 450,
   said polyamide is a liquid having an amine value of from about 290 to 320, and
   said coating composition contains additionally a minor amount by weight of a thixotropic agent,
   in which said fiberglass reinforced plastic moldings are polyester-styrene-glass fiber moldings in-mold coated with a thermoset polyesterurethane in-mold coating and in which said adhesive is a polyurethane.

3. A method according to claim 2 in which in said coating composition:
   said epoxy resin is a mixture of 1,4-butanedioldiglycidyl ether and an epoxy resin from epichlorohydrin and bisphenol A,
   said polyamide resin is the condensation product of polyamines and dibasic acids of polymerized unsaturated fatty acids,
   said primary diamine is ethylene diamine and said thixotropic agent is fumed silica.

4. The product produced by the method of claim 1.
5. The product produced by the method of claim 2.
6. The product produced by the method of claim 3.

* * * * *